United States Patent
Barov (10) Patent No.: US 11,693,832 B2
(45) Date of Patent: Jul. 4, 2023

(54) FLATTENING OF HIERARCHICAL DATA INTO A RELATIONAL SCHEMA IN A COMPUTING SYSTEM

(71) Applicant: VMware, Inc., Palo Alto, CA (US)

(72) Inventor: Rumen Barov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 1039 days.

(21) Appl. No.: 15/922,594

(22) Filed: Mar. 15, 2018

(65) Prior Publication Data

US 2019/0286722 A1  Sep. 19, 2019

(51) Int. Cl.
- *G06F 16/00* (2019.01)
- *G06F 16/21* (2019.01)
- *G06F 9/54* (2006.01)
- *G06F 16/28* (2019.01)
- *G06F 16/25* (2019.01)
- *G06F 16/22* (2019.01)

(52) U.S. Cl.
CPC .............. *G06F 16/211* (2019.01); *G06F 9/54* (2013.01); *G06F 16/2282* (2019.01); *G06F 16/252* (2019.01); *G06F 16/28* (2019.01)

(58) Field of Classification Search
CPC ...... G06F 16/28; G06F 16/211; G06F 16/252; G06F 16/2282
USPC .......................................................... 707/803
See application file for complete search history.

(56) References Cited

U.S. PATENT DOCUMENTS

| | | | | |
|---|---|---|---|---|
| 4,860,201 A * | 8/1989 | Stolfo | ............... | G06F 16/90348 707/E17.104 |
| 6,457,065 B1 * | 9/2002 | Rich | ................... | G06F 16/2379 719/329 |
| 7,117,504 B2 * | 10/2006 | Smith | ....................... | G06F 8/20 709/227 |
| 7,581,172 B2 * | 8/2009 | Ozzie | .................... | G06F 40/221 715/255 |
| 7,730,099 B2 * | 6/2010 | George | ................ | G06F 16/289 703/13 |
| 7,814,047 B2 * | 10/2010 | Jain | ......................... | G06F 16/86 707/602 |
| 7,877,418 B2 * | 1/2011 | Sluiman | ................ | G06F 16/289 707/999.1 |
| 7,941,417 B2 * | 5/2011 | Ramarao | ............... | G06F 40/149 707/706 |
| 8,032,860 B2 * | 10/2011 | Piehler | .................... | G06F 40/10 717/110 |
| 8,099,342 B1 * | 1/2012 | Christian | ............. | G06Q 40/123 705/31 |
| 8,121,976 B2 * | 2/2012 | Kalia | .................... | G06F 16/284 717/136 |

(Continued)

*Primary Examiner* — Amresh Singh
*Assistant Examiner* — Rezwanul Mahmood
(74) *Attorney, Agent, or Firm* — Patterson + Sheridan, LLP (57) ABSTRACT

An example method of generating telemetry data from application programming interface (API) data in a computing system includes: obtaining the API data from a plurality of software components executing in a plurality of client computers; serializing the API data for transmission from the client computers to a server computer, the serialized data including a parent object having a child object; and generating the telemetry data having a relational schema from the serialized telemetry data by generating a table for the parent object and storing attributes of the child object in the table generated for the parent object.

20 Claims, 8 Drawing Sheets

(56) References Cited

U.S. PATENT DOCUMENTS

| | | | |
|---|---|---|---|
| 8,136,109 B1* | 3/2012 | Birdeau | G06F 9/44526 |
| | | | 717/175 |
| 9,430,114 B1* | 8/2016 | Dingman | G06F 16/25 |
| 9,473,304 B1* | 10/2016 | Dixon | H04L 67/01 |
| 9,804,886 B1* | 10/2017 | Wells | G06F 9/465 |
| 9,830,319 B1* | 11/2017 | Tortosa | G06F 16/86 |
| 10,025,673 B1* | 7/2018 | Maccanti | G06F 11/1451 |
| 10,216,903 B2* | 2/2019 | Thomas | G16H 40/63 |
| 10,275,292 B1* | 4/2019 | Atkinson | G06F 8/36 |
| 10,437,804 B1* | 10/2019 | Tsypliaev | G06F 16/2246 |
| 10,489,355 B1* | 11/2019 | Messmer | G06F 16/211 |
| 10,691,686 B2* | 6/2020 | Wright | G06F 40/166 |
| 10,817,510 B1* | 10/2020 | Haynes | G06F 16/2393 |
| 2001/0047372 A1* | 11/2001 | Gorelik | G06F 16/84 |
| | | | 715/239 |
| 2001/0056362 A1* | 12/2001 | Hanagan | G06F 16/289 |
| | | | 705/40 |
| 2003/0018644 A1* | 1/2003 | Bala | G06F 40/18 |
| 2003/0144894 A1* | 7/2003 | Robertson | G06Q 20/04 |
| | | | 709/226 |
| 2003/0182268 A1* | 9/2003 | Lal | G06F 16/86 |
| 2003/0182624 A1* | 9/2003 | Large | G06F 16/958 |
| | | | 707/E17.116 |
| 2004/0015516 A1* | 1/2004 | Harter | G06F 16/24539 |
| 2004/0064441 A1* | 4/2004 | Tow | G06F 16/24542 |
| 2004/0220946 A1* | 11/2004 | Krishnaprasad | G06F 16/88 |
| 2005/0097575 A1* | 5/2005 | McCain | G06F 9/44536 |
| | | | 719/328 |
| 2005/0102260 A1* | 5/2005 | Spring | G06Q 10/10 |
| 2005/0160424 A1* | 7/2005 | Broussard | G06F 9/5088 |
| | | | 718/1 |
| 2005/0182779 A1* | 8/2005 | Perry | G06F 16/86 |
| 2005/0192989 A1* | 9/2005 | Adiba | G06F 16/273 |
| 2005/0210002 A1* | 9/2005 | Pal | G06F 16/8358 |
| 2005/0240943 A1* | 10/2005 | Smith | G06F 3/00 |
| | | | 719/328 |
| 2006/0047780 A1* | 3/2006 | Patnude | H04L 67/01 |
| | | | 709/219 |
| 2006/0095431 A1* | 5/2006 | Nash | G06Q 30/0641 |
| 2006/0149782 A1* | 7/2006 | Yeh | G06F 8/20 |
| 2006/0206502 A1* | 9/2006 | Gaurav | G06F 16/258 |
| 2006/0218538 A1* | 9/2006 | van Kesteren | G06F 9/4493 |
| | | | 717/137 |
| 2006/0235984 A1* | 10/2006 | Kraus | G06F 40/174 |
| | | | 709/228 |
| 2007/0050399 A1* | 3/2007 | George | G06F 16/289 |
| | | | 707/999.102 |
| 2007/0136335 A1* | 6/2007 | Dionne | G06F 16/367 |
| 2008/0059500 A1* | 3/2008 | Symens | G06F 16/283 |
| 2009/0006429 A1* | 1/2009 | Champion | G06F 8/427 |
| 2009/0022312 A1* | 1/2009 | Mayor | G06F 16/93 |
| | | | 380/243 |
| 2009/0287719 A1* | 11/2009 | Warner | G06F 16/86 |
| 2011/0161375 A1* | 6/2011 | Tedder | G06F 16/958 |
| | | | 715/234 |
| 2011/0289118 A1* | 11/2011 | Chen | G06F 16/86 |
| | | | 707/E17.054 |
| 2011/0320403 A1* | 12/2011 | O'Krafka | G06F 16/273 |
| | | | 707/E17.007 |
| 2011/0320498 A1* | 12/2011 | Flor | G06F 16/322 |
| | | | 707/E17.087 |
| 2012/0331061 A1* | 12/2012 | Lininger | G06F 30/13 |
| | | | 709/205 |
| 2013/0120367 A1* | 5/2013 | Miller | G06T 19/00 |
| | | | 345/419 |
| 2013/0159960 A1* | 6/2013 | Sivaramakrishnan | G06F 8/33 |
| | | | 717/100 |
| 2013/0166568 A1* | 6/2013 | Binkert | G06F 16/81 |
| | | | 707/769 |
| 2013/0179962 A1* | 7/2013 | Arai | H04L 67/01 |
| | | | 726/9 |
| 2013/0218933 A1* | 8/2013 | Ismailov | G06F 9/4493 |
| | | | 707/E17.127 |
| 2013/0318148 A1* | 11/2013 | Atamel | G06F 16/958 |
| | | | 709/203 |
| 2014/0026027 A1* | 1/2014 | Style | G06F 16/24557 |
| | | | 715/234 |
| 2014/0040182 A1* | 2/2014 | Gilder | G06F 16/256 |
| | | | 707/602 |
| 2014/0101538 A1* | 4/2014 | Style | G06F 40/143 |
| | | | 715/234 |
| 2014/0108917 A1* | 4/2014 | Style | G06F 40/143 |
| | | | 715/234 |
| 2014/0137242 A1* | 5/2014 | Kolbly | H04L 63/1408 |
| | | | 726/22 |
| 2014/0279838 A1* | 9/2014 | Tsirogiannis | G06F 16/22 |
| | | | 707/603 |
| 2015/0066930 A1* | 3/2015 | Tibrewal | G06F 16/26 |
| | | | 706/12 |
| 2015/0100627 A1* | 4/2015 | Benke | G06F 40/221 |
| | | | 709/203 |
| 2015/0113023 A1* | 4/2015 | Baldwin | G06F 16/289 |
| | | | 707/803 |
| 2016/0004729 A1* | 1/2016 | Evans | G06F 16/212 |
| | | | 707/803 |
| 2016/0062997 A1* | 3/2016 | Roussey | G06F 16/24552 |
| | | | 707/736 |
| 2016/0088109 A1* | 3/2016 | Chen | H04L 67/10 |
| | | | 709/203 |
| 2016/0170722 A1* | 6/2016 | Evans | G06F 16/212 |
| | | | 717/104 |
| 2016/0335297 A1* | 11/2016 | Teodorescu | G06F 16/2228 |
| 2016/0379116 A1* | 12/2016 | Lottini | G06F 16/2282 |
| | | | 706/46 |
| 2017/0132334 A1* | 5/2017 | Levinson | G01S 17/931 |
| 2017/0187782 A1* | 6/2017 | Crawford | H04L 67/565 |
| 2017/0308606 A1* | 10/2017 | Jonsson | G06F 16/258 |
| 2017/0322298 A1* | 11/2017 | Beitelspacher | G01S 13/22 |
| 2017/0352174 A1* | 12/2017 | Gorishniy | G06F 16/904 |
| 2018/0074867 A1* | 3/2018 | Srivastava | G06F 9/543 |
| 2018/0365272 A1* | 12/2018 | Sastry | G06F 16/211 |
| 2019/0058643 A1* | 2/2019 | Knowles | G06F 16/288 |
| 2019/0068685 A1* | 2/2019 | He | G06Q 10/101 |
| 2019/0138283 A1* | 5/2019 | Pletter | G06F 16/27 |
| 2019/0286722 A1* | 9/2019 | Barov | G06F 9/54 |
| 2019/0349262 A1* | 11/2019 | Miedema | H04L 41/145 |
| 2020/0019423 A1* | 1/2020 | Marks | G06F 8/443 |
| 2020/0265025 A1* | 8/2020 | Krishnan | G06F 16/213 |

* cited by examiner

VIM_DATASTORE

| ID | CAPABILITY_DIRECTORY HIERARCHYSUPPORTED | CAPABILITY_TOPLEVELDIRECTORY CREATESUPPORTED | INFO_FREESPACE | INFO_MAX FILESIZE | INFO_X_Y |
|---|---|---|---|---|---|
| XY | TRUE | TRUE | 123456 | 9876543 | Z |

VIM_DATASTORE

| ID | STANDALONEOBJECT |
|---|---|
| vim.Datastore:datastore-1234 | 1234567890 |

EXAMPLE_TOPLEVELOBJECT

| ID | SOMEVALUE | VIM_DATASTORE_FK |
|---|---|---|
| 1234567890 | 42 | vim.Datastore:datastore-1234 |

FIG. 8

900 vim.VirtualMachine

| ID | CONFIG_HARDWARE_DEVICE |
|---|---|
| vm1 | device0,device1 | vim.vm.device.VirtualKeyboard

| ID | KEY | vim.VirtualMachine__FK |
|---|---|---|
| device1 | 201 | vm1 | vim.vm.device.VirtualIDEControl

| ID | KEY | vim.VirtualMachine__FK |
|---|---|---|
| device0 | 200 | vm1 |

FIG. 9

FLATTENING OF HIERARCHICAL DATA INTO A RELATIONAL SCHEMA IN A COMPUTING SYSTEM

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor," includes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Providers of virtualization software and services collect data from their customers. For example, the data can include configurations and usage of the virtualization software collected from various components thereof. However, the schema of the data from the different software components can differ from one component to another. Even if two software components are providing the same data, the data can be represented using different schemas. This requires significant human and computational effort by the provider before the data is ready for analysis that may impact business decisions.

SUMMARY

One or more embodiments provide method of generating telemetry data from application programming interface (API) data in a computing system that includes: obtaining the API data from a plurality of software components executing in a plurality of client computers; serializing the API data for transmission from the client computers to a server computer, the serialized data including a parent object having a child object; and generating the telemetry data having a relational schema from the serialized telemetry data by generating a table for the parent object and storing attributes of the child object in the table generated for the parent object.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
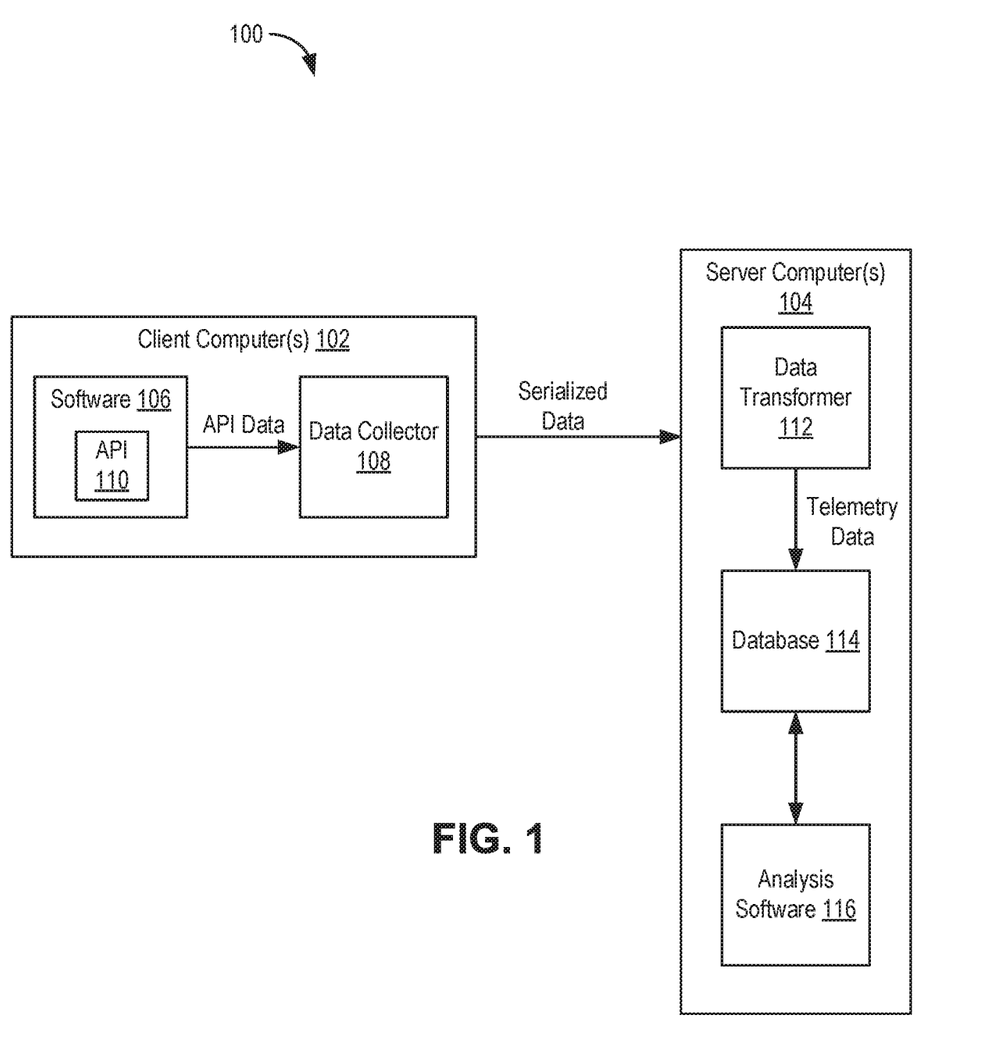
FIG. 1 is a block diagram depicting a computing system according to an embodiment.

FIG. 1 is a block diagram depicting a computing system 100 according to an embodiment. Computing system 100 includes one or more client computers 102 and one or more server computers 104. Client computer(s) 102 execute software 106. Software 106 can include an operating system (OS), hypervisor, applications, and the like type software components. The various software components of software 106 generate application programming interface (API) data to be provided to server computer(s) 104. The API data includes a myriad of types of data, such as configurations and usage of software 106. Client computer(s) 102 also execute data collection software ("a data collector 108"). Data collector 108 is configured to obtain the API data from the software components of software 106. In an embodiment, data collector 108 obtains the API data using methods defined in an API 110 of each software component in software 106.

Data collector 108 is further configured to serialize the API data and send the serialized API data ("serialized data") to server computer(s) 104. In an embodiment, data collector 108 uses JavaScript Object Notation for Linked Data (JSON-LD) serialization for the serialized data. JSON-LD is a method of encoding Linked Data using JSON. However, it should be understood that any type of serialization of the API data can be used. In general, the serialized data is represented using a tree-like schema (e.g., a hierarchical data model).

Server computer(s) 104 implement Extract Transform Load (ETL) to convert data from different sources (e.g., the different software components of software 106) to a common schema. In an embodiment, the common schema is a relational schema. Server computer(s) 104 include data transformation software ("a data transformer 112") configured to transform the serialized data into relational data ("telemetry data") having a relational schema. In general, the relational schema represents data in terms of tuples grouped into relations. For example, the relational schema can be tables having columns and rows. Data transformer 112 is configured to convert from the hierarchical schema of the serialized data to the relational schema of the telemetry data (e.g., referred to as "data flattening"). Data transformer 112 provides the telemetry data for storage by database software ("a database 114"). Database 114 can be a Structured Query Language (SQL)-based database or the like. Server computer(s) 104 can also include analysis software 116 configured to analyze the telemetry data. Analysis software 116 is optimized for the relational schema (e.g., flat data model).

The data flattening operation performed by data transformer 112 allows for efficient reporting (e.g., less JOIN statements, faster queries, and simplified data lineage). Further, simplified SQL queries can reduce the complexity of database 114. In addition, there is no modification required for the software components of software 106. Data collector 108 obtains native data from the software components and performs serialization thereof for transmission to server computer(s) 104.

Figure 2:
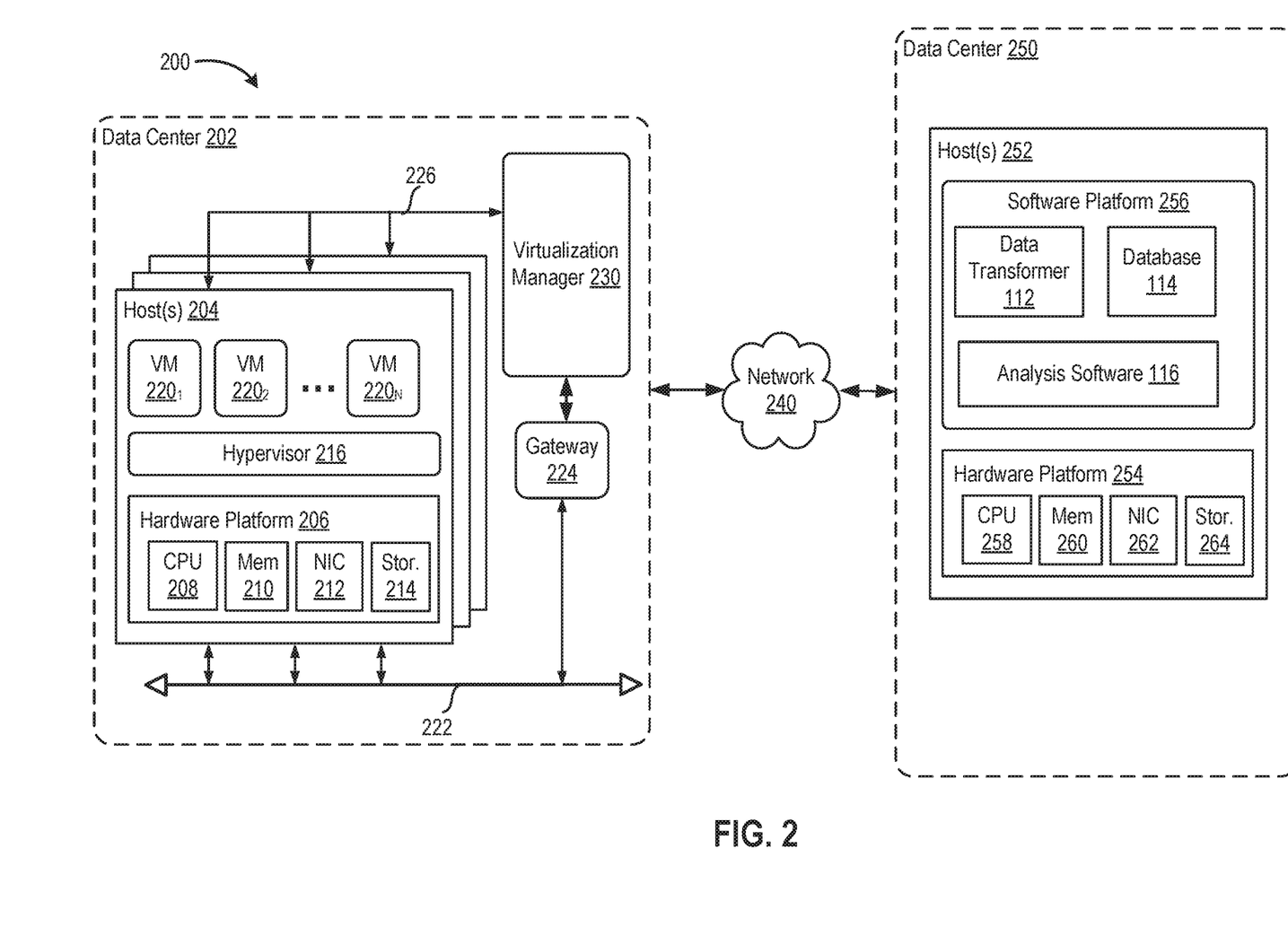
FIG. 2 is a block diagram of a computing system n which one or more embodiments of the present disclosure may be utilized.

FIG. 2 is a block diagram of a computing system 200 in which one or more embodiments of the present disclosure may be utilized. Computing system 200 is an example implementation of computing system 100 of FIG. 1 described above. Computing system 200 includes a data center 102 and a data center 250. Data center 102 includes one or more host computer systems ("hosts 204"). Hosts 204 may be constructed on a server grade hardware platform 206, such as an x86 architecture platform. As shown, hardware platform 206 of each host 204 may include conventional components of a computing device, such as one or more processors (CPUs) 208, system memory 210, a network interface 212, storage system 214, and other I/O devices such as, for example, a mouse and keyboard (not shown). CPU 208 is configured to execute instructions, for example, executable instructions that perform one or more operations described herein and may be stored in memory 210 and in local storage. Memory 210 is a device allowing information, such as executable instructions, cryptographic keys, virtual disks, configurations, and other data, to be stored and retrieved. Memory 210 may include, for example, one or more random access memory (RAM) modules. Network interface 212 enables host 204 to communicate with another device via a communication medium, such as a network 222 within data center 202. Network interface 212 may be one or more network adapters, also referred to as a Network Interface Card (NIC). Storage system 214 represents local storage devices (e.g., one or more hard disks, flash memory modules, solid state disks, and optical disks) and/or a storage interface that enables host 204 to communicate with one or more network data storage systems. Examples of a storage interface are a host bus adapter (HBA) that couples host 204 to one or more storage arrays, such as a storage area network (SAN) or a network-attached storage (NAS), as well as other network data storage systems.

Each host 204 is configured to provide a virtualization layer that abstracts processor, memory, storage, and networking resources of hardware platform 206 into multiple virtual machines $220_1$ to $220_N$ (collectively referred to as VMs 220) that run concurrently on the same hosts. VMs 220 run on top of a software interface layer, referred to herein as a hypervisor 216, that enables sharing of the hardware resources of host 204 by VMs 220. One example of hypervisor 216 that may be used in an embodiment described herein is a VMware ESXi™ hypervisor provided as part of the VMware vSphere® solution made commercially available from VMware, Inc. of Palo Alto, Calif. Hypervisor 216 may run on top of the operating system of host 204 or directly on hardware components of host 204.

Data center 202 includes a virtualization management component (depicted in FIG. 2 as virtualization manager 230) that may communicate to the plurality of hosts 204 via a network, sometimes referred to as a management network 226. In one embodiment, virtualization manager 230 is a computer program that resides and executes in a central server, which may reside in data center 202, or alternatively, running as a VM in one of hosts 204. One example of a virtualization manager is the vCenter Server™ product made available from VMware, Inc. Virtualization manager 230 is configured to carry out administrative tasks for computing system 202, including managing hosts 204, managing VMs 220 running within each host 204, provisioning VMs, migrating VMs from one host to another host, and load balancing between hosts 204.

In one embodiment, virtualization manager 230 is configured to control network traffic into network 222 via a gateway component (depicted as a gateway 224). Gateway 224 (e.g., executing as a virtual appliance) is configured to provide VMs 220 and other components in data center 202 with connectivity to an external network 240 (e.g., Internet). Gateway 224 may manage external public IP addresses for VMs 220 and route traffic incoming to and outgoing from on-premise data center 102 and provide networking services, such as firewalls, network address translation (NAT), dynamic host configuration protocol (DHCP), load balancing, and virtual private network (VPN) connectivity over a network 240.

Data center 202 includes various software components that generate API data, including hypervisor 216, VMs 220, guest software executing in VMs 220, virtualization manager 230, and the like. Data collector 108 (FIG. 1) can be implemented in a VM 220, within virtualization manager 230, or within another server that resides in data center 202. Data collector 108 obtains the API data from the various software components in data center 202 and transmits serialized data to data center 250 for processing, storage, and analysis.

Data center 250 includes one or more host(s) 252. Each host 252 includes a software platform 256 executing on a hardware platform 254. Hardware platform 254 includes a CPU 258, memory 260, NIC 262, and storage 264, which function similar to CPU 208, memory 210, NIC 212, and storage 214, respectively, described above. Software platform 256 includes data transformer 112, database 114, and analysis software 116. Software platform 256 can include an OS or virtualization software (e.g., hypervisor 216). Data transformer 112, database 114, and analysis software 116 can execute directly on an OS or within a VM managed by a hypervisor. Data transformer 112, database 114, and analysis software 116 can execute on the same host 252 or different hosts 252. Each of data transformer 112, database 114, and analysis software 116 can include one or more components executing on a respective one or more hosts 252.

Figure 3:
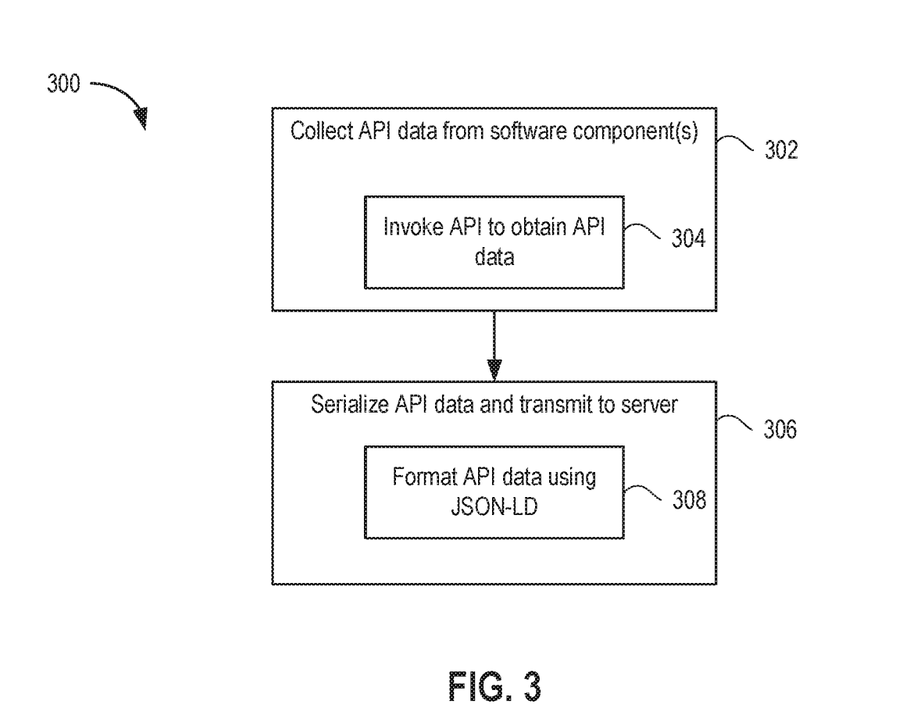
FIG. 3 is a flow diagram depicting a method of obtaining telemetry data from software components according to an embodiment.

FIG. 3 is a flow diagram depicting a method 300 of generating telemetry data from API data provided by software components according to an embodiment. Method 300 begins at step 302, where data collector 108 collects API data from the software components of software 106. For example, data collector can invoke an API of each software component to obtain the API data (step 304). In the example of FIG. 2, data collector 108 collects API data from hypervisor 216, VMs 220, guest software executing in VMs 220, virtualization manager 230, and the like. At step 306, data collector 108 serializes the API data and transmits the serialized data to server computer(s) 104. In general, data collector 108 serializes the API data based on a tree-like or other hierarchical schema. In an embodiment, data collector 108 formats the API data using JSON-LD (step 308). In the embodiment of FIG. 2, data collector 108 forwards the serialized data to host(s) 252 in data center 250.

Figure 4:
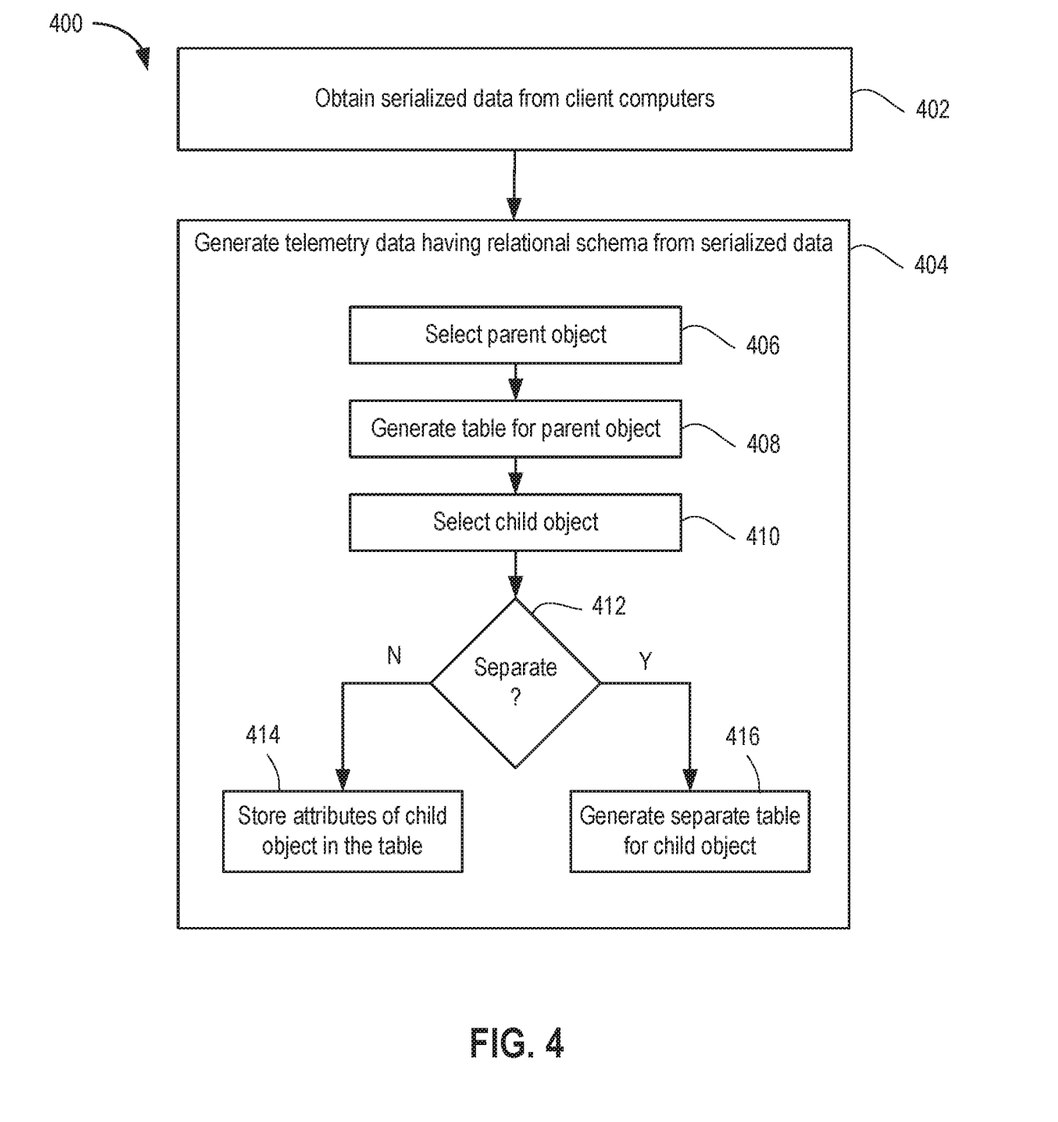
FIG. 4 is a flow diagram depicting a method of processing serialized telemetry data according to an embodiment.

FIG. 4 is a flow diagram depicting a method 400 of processing serialized data according to an embodiment. Method 400 begins at step 402, where data transformer 112 obtains serialized data from client computer(s) 102. In the embodiment of FIG. 2, data transformer 112 obtains serialized data from data center 202. At step 404, data transformer 112 generates telemetry data from the serialized data. The telemetry data has a relational schema.

Figure 7:
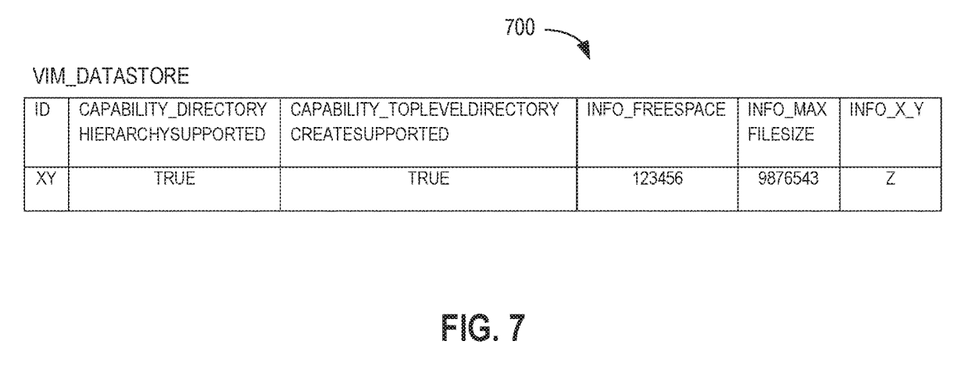
FIG. 7 depicts a table generated for a parent object having three child objects according to an embodiment.

In an embodiment, the serialized data includes parent objects and child objects disposed in a hierarchy. Each parent object can include zero or more child objects. At step 406, data transformer 112 selects a parent object in the serialized data. At step 408, data transformer 112 generates a table for the parent object. The table is a flattened representation of the parent object. An example table is shown in FIG. 7 and described below. At step 410, data transformer 112 selects a child object in the parent object. At step 412, data transformer 112 determines if the data in the child object should be stored in a separate table from the parent object. If not, method 400 proceeds to step 414, where data transformer 112 stores attributes of the child object in the table generated for the parent. Otherwise, method 400 proceeds to step 416, where data transformer 112 generates a separate table for the child object. Steps 410, 412, 414, and 416 can be repeated for each child object of the parent object. Steps 406-416 can be repeated for each parent object in the serialized data. The process of steps 406-416 results in significantly fewer tables, since for a large number of child objects the attributes thereof are stored in the table generated for the parent, rather than in a separate table. For some child objects, separate tables may still be required, as discussed further in the examples below.

Data transformer 112 executes method 400 to flatten the serialized data. The flattening of nested objects (parent and child objects) eases analysis by reducing the number of generated tables and reducing the number of required SQL JOIN statements needed to query the tables. In general, flattening is implemented by storing child object attributes in the table where the parent object attributes are stored. By way of example, consider the following snippet of a vim.Datastore object describing a configuration of a datastore for use by VMs:

```
{
   "@id": "XY",
   "@type": "vim.Datastore",
   "capability": {
      "directoryHierarchySupported": true,
      "topLevelDirectoryCreateSupported": true,
      ...
   },
   "info": {
      "freeSpace": 123456,
      "maxFileSize": 9876543,
      "x": {
         "y": "z"
      },
      ...
   }, ...
}
```

For the example object above, data transformer 112 generates a table 700 as shown in FIG. 7. In general, each parent and child object in the serialized data includes a plurality of key-value pairs. A table generated for a parent object can include a column for each of one or more keys. In addition, the table can include a column for each of one or more keys of the child object. In the example, table 700 includes a column ID corresponding to the key "@id." Table 700 also includes a column CAPABILITY_DIRECTORYHIERARCHYSUPPORTED and a column CAPABILITY_TOPLEVELDIRECTORYCREATESUPPORTED for the corresponding keys of the "capability" child object. Table 700 also includes a column INFO_FREESPACE and a column INFO_MAXFILESIZE for the corresponding keys of the "info" child object. Table 700 also includes a column INFO_X_Y for the key "y" of the child object "x". In the example, each child key is prepended with the name of the child object when creating the column names (e.g., the "freeSpace" key of the "info" child object becomes the column INFO_FREESPACE). Also, in the example the parent object includes a key "@type," which does not result in the addition of a column in table 700. Rather, data transformer 112 uses the value associated with the "@type" key as the title of the table. In general, a parent object may have a defined type. In such case, data transformer 112 generates a title for the table derived from the value of the defined type. If the parent object does not include a defined type, data transformer 112 can generate a default name for the table derived from attributes of the parent object.

Figure 8:
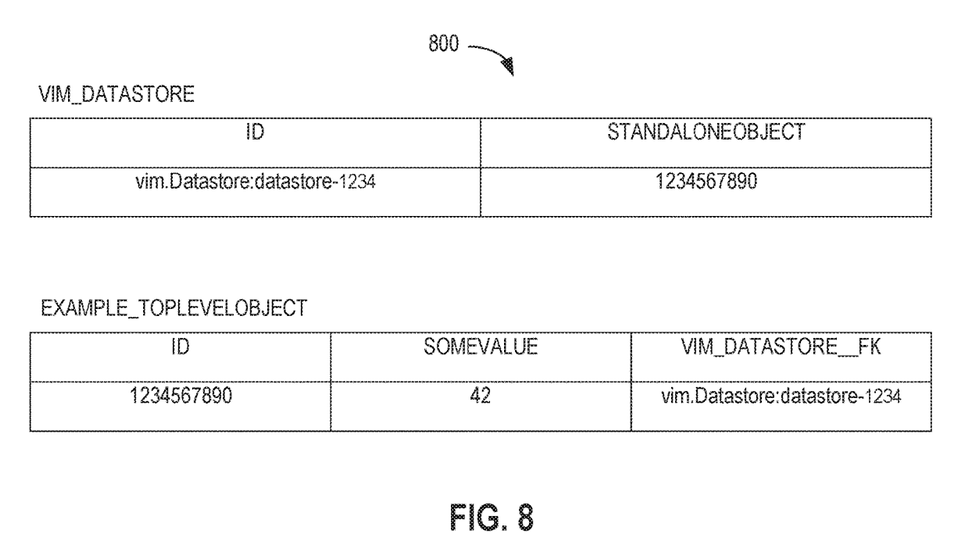
FIG. 8 depicts tables generated for a parent object having a child object according to an embodiment.

In an embodiment, if a child object includes a defined type, data transformer 112 does add a column to the table for the "@type" key. In an embodiment, if a child object includes a defined identifier (e.g., an "@id" key), this is an indication to data transformer 112 to not flatten the child object. In such case, data transformer 112 generates a separate table for the child object. By way of example, consider the following snippet of a vim.Datastore object describing a configuration of a datastore for use by VMs:

```
{
   "@id": "vim.Datastore:datastore-1234",
   "@type": "vim.Datastore",
   "standaloneobject": {
      "@id": "1234567890",
      "@type": "example.TopLevelObject",
      "somevalue": 42,
      ...
   },
   ...
}
```

For the example object above, data transformer 112 generates tables 800 as shown in FIG. 8. Data transformer 112 generates a table "VIM_DATASTORE" for the parent object, similar to the example above. The parent table includes an ID column having the value of the @id key. In this example, the "standaloneobject" child object includes its own @id key and so data transformer 112 generates a separate table for the child object. In the parent table, data transformer 112 generates a column "STANDALONEOBJECT" having the value of the @id key for the child object. Data transformer 112 also generates an "EXAMPLE_TOPLEVELOBJECT" table for the child object (based on the value of the @type key in the child object). The child table includes a column ID corresponding to the @id key and a column SOMEVALUE corresponding to the "somevalue" key. The child table further includes an VIM_DATASTORE_FK column to provide a foreign key link back to the parent table (using the value of the @id key in the parent object).

In an embodiment, data transformer 112 handles primitive arrays defined in a parent or child object by serializing the values into a comma-separated string. For example, consider the following snippet:

```
{
   "child" : {
      "myarr": [1,2,3]
   },
   "@type": "root",
}
```

In this example, the parent table includes a column CHILD_MYARR corresponding to the "myarr" key in the child object "child." The value of the "myarr" key is a primitive array (e.g., an array of integers in this case, but it could be an array of other primitive data types known in the art). Data transformer 112 serializes the values in the array into a comma-separated string (or any other delimiter other than comma) in single cell in the column CHILD_MYARR.

Figure 9:
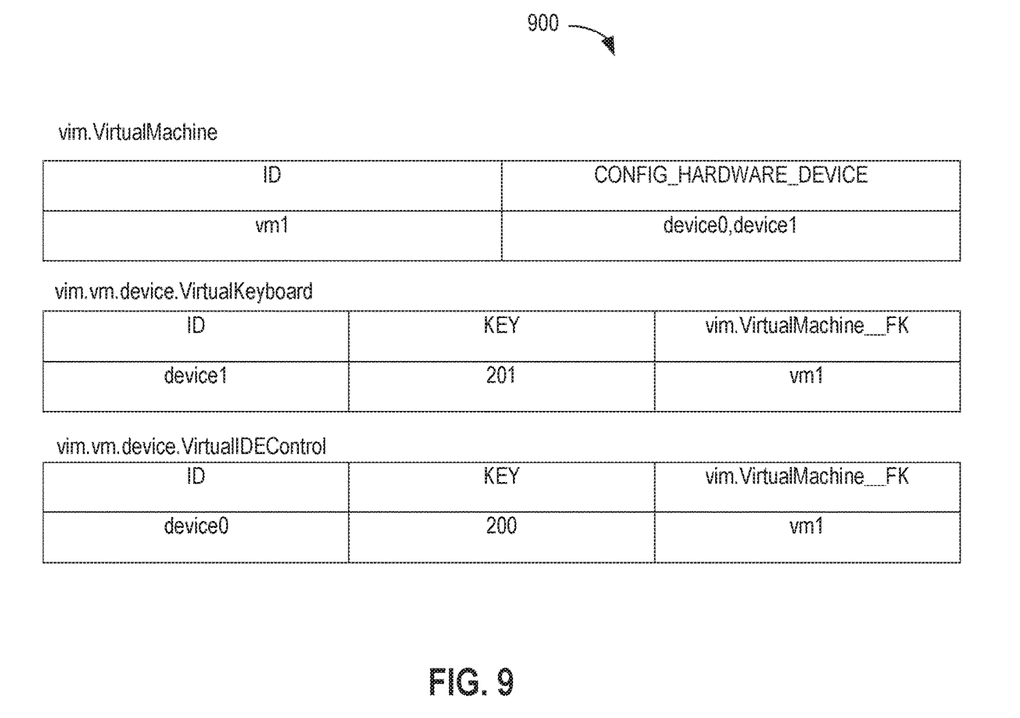
FIG. 9 depicts tables generated for a parent object having and array of child objects according to an embodiment.

In an embodiment, another instance when data transformer 112 creates separate child tables is in the case of an array of child objects (as opposed to a primitive array discussed above). In this case, data transformer 112 creates one or more tables for the child object array depending on the defined type of the child objects in the array. For child objects of the array having the same type, a single separate table is created having a row for each of those child objects. For child objects of the array having different types, a separate child table is created for each of those child objects. Consider the following example snippet:

```
{
    "@type": "vim.VirtualMachine",
    "@id": "vm1",
    "config": {
        "hardware": {
            "device": [
                {
                    "@type": "vim.vm.device.VirtualIDEController",
                    "key": 200
                },
                {
                    "@type": "vim.vm.device.VirtualKeyboard",
                    "key": 201
                }
            ]
        }
    }
}
```

For the example object above, data transformer 112 generates tables 900 as shown in FIG. 9. Data transformer 112 generates a parent table "vim.VirtualMachine" for the parent object of type "vim.VirtualMachine." The vim.VirtualMachine table includes a column ID corresponding to the @id key and a column "CONFIG_HARDWARE_DEVICE corresponding to the array of "device" child objects. The "CONFIG_HARDWARE_DEVICE" column includes the identifiers of the "device" child objects. In this example, the device child objects do not include an explicit identifier defined by an @id key, so data transformer 112 generates default identifiers. The row includes a comma separated list of identifiers for the "device" child objects in the column "CONFIG_HARDWARE_DEVICE." Also in this example, each "device" child object has a different defined type (e.g., type "vim.vm.device.VirtualIDEController" and type "vim.vm.device.VirtualKeyboard"). Thus, data transformer 112 generates two separate tables, one for each "device" child object in the array of child objects. One child table has the title "vim.vm.device.VirtualIDEController" and the other child table has the title "vim.vm.device.VirtualKeyboard", corresponding to the values of the @type keys for the child objects. Each child table includes a KEY column and a vim.VirtualMachine_FK column. The row in each child table includes a value of the "key" key under the KEY column. The VirtualMachine_FK column is for linking back to the parent table. The row in each child table includes the ID of the parent object under the vim.VirtualMachine_FK column.

Figure 5:
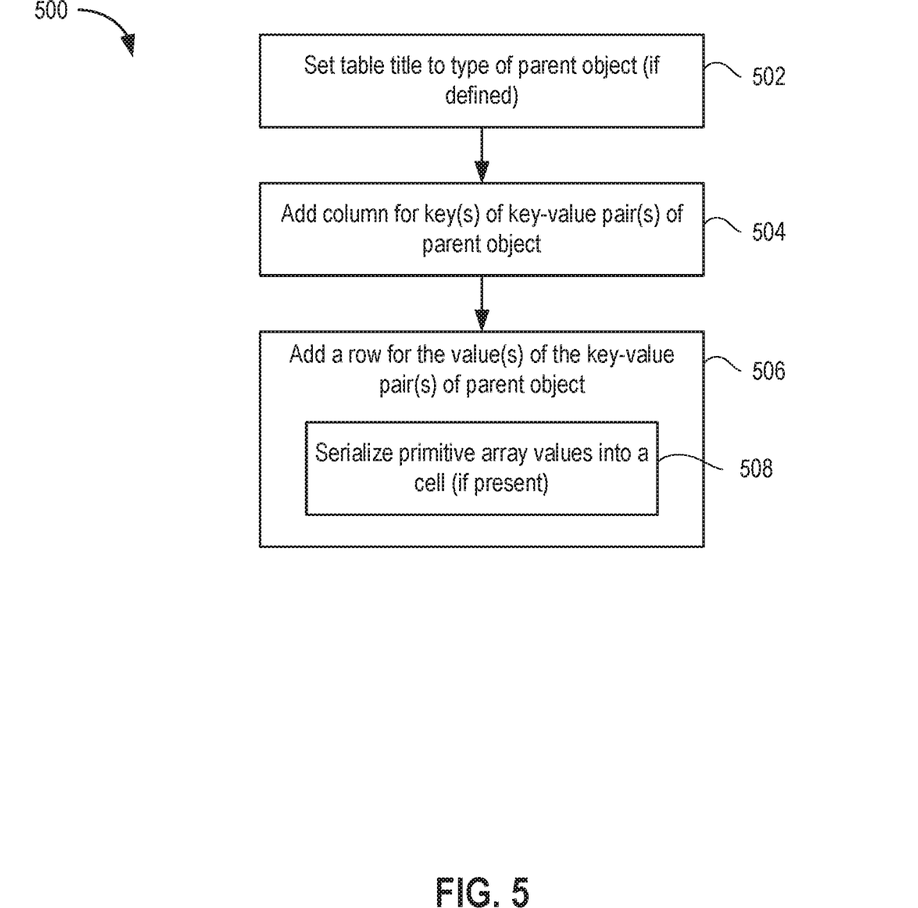
FIG. 5 is a flow diagram depicting a method of generating a table in response to a parent object according to an embodiment.

FIG. 5 is a flow diagram depicting a method 500 of generating a table in response to a parent object according to an embodiment. Method 500 begins at step 502, where data transformer 112 sets the table title based on a defined type of the parent object (if defined). At step 504, data transformer adds a column for key(s) of key-value pair(s) of the parent object. At step 506, data transformer adds a row for the value(s) of the key-value pair(s) of the parent object. If a primitive array is present, data transformer serializes the primitive array values into a cell (step 508).

Figure 6:
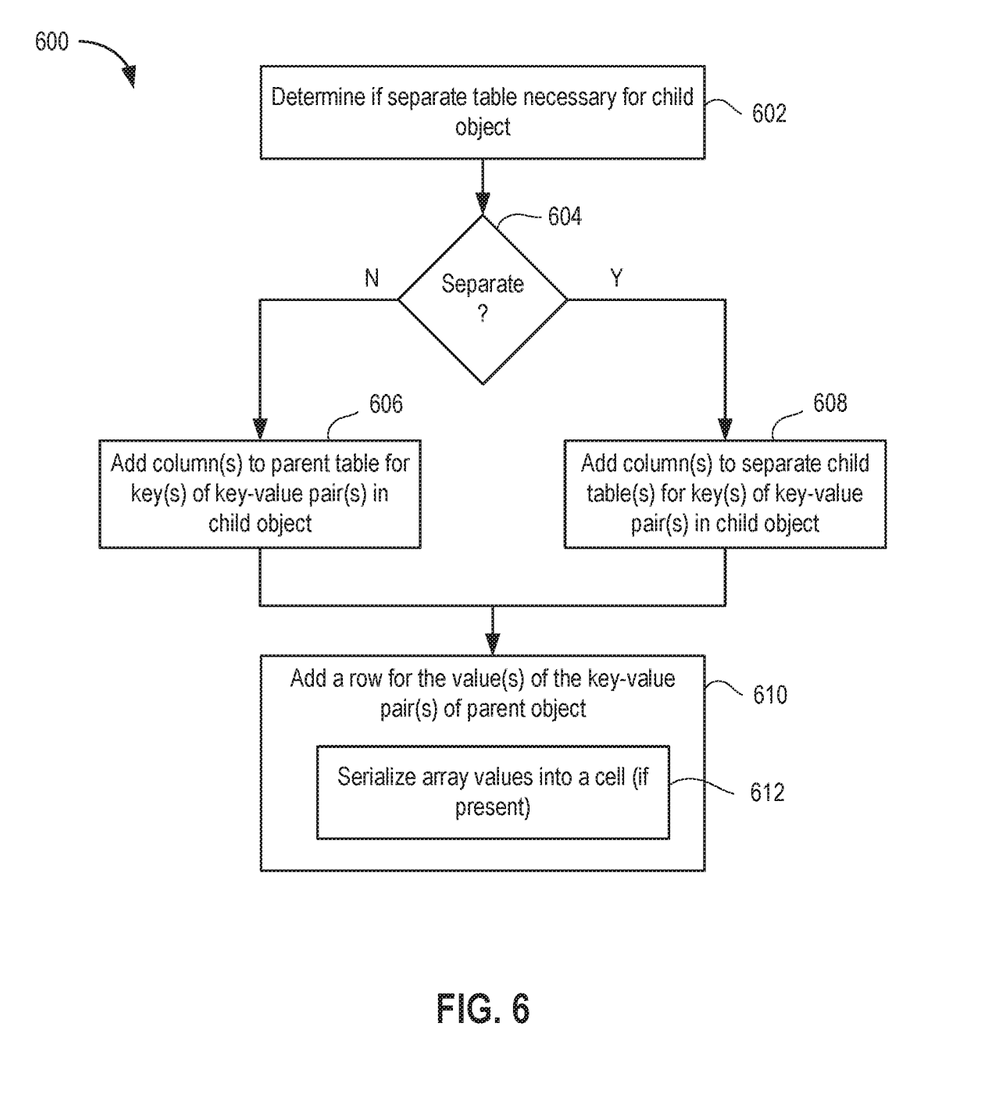
FIG. 6 is a flow diagram depicting a method of processing a child object according to an embodiment.

FIG. 6 is a flow diagram depicting a method 600 of processing a child object according to an embodiment. Method 600 begins at step 602, where data transformer 112 determines if a separate table is necessary for the child. For example, as described above, the child object can include a particular key, such as an identifier, that causes data transformer 112 to generate a separate table for the child object. In another example, a parent object can include an array of child objects. At step 604, data transformer 112 determines if a separate table is necessary and proceeds to step 606 if not or step 608 if so. At step 606, data transformer 112 adds column(s) to the parent table for key(s) of key-value pair(s) in the child object. Otherwise, at step 608, data transformer 112 adds column(s) to a separate child table(s) for key(s) of key-value pair(s) in the child object. For example, data transformer 112 creates a separate child table for each child object having a different defined type. Method 600 proceeds to step 610, where data transformer adds the value(s) of the key-value pair(s) to the row in the parent table (or separate child table) according to the columnar structure. If a primitive array is present, data transformer serializes the primitive array values into a cell (step 612).

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. Further, the various embodiments herein include execution of software that improves the functionality of the computing system on which it is executed. In particular, the techniques described herein for flattening tree-like or hierarchical telemetry data results in generation of less tables of relational data, improving the efficiency of the query operations by using less JOIN statements, and improving data lineage.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of generating telemetry data from application programming interface (API) data in a computing system, comprising:
obtaining the API data from a plurality of software components executing in a plurality of client computers; and
serializing the API data for transmission from the client computers to a server computer, the serialized data including at least one data structure that includes a parent object having an array of child objects comprising a child object and an additional child object, wherein:
the server computer, after receiving the serialized data, generates the telemetry data having a relational schema from the serialized data by generating a table for the parent object and storing attributes of the child object and the additional child object in the table generated for the parent object, wherein:
the child object has a first type;
the additional child object has a second type different than the first type;
generating the telemetry data further comprises generating a separate table for each of the child object and the additional child object;
if the child object or the additional child object does not include an explicit identifier defined by an identifier key, a default identifier is generated for the child object or the additional child object for inclusion in the table for the parent object; and
at least one of the parent object or the child object includes a primitive array, and the table generated for the parent object or the separate table generated for the child object includes a cell having serialized values of the primitive array.

2. The method of claim 1, wherein the parent object has a defined type and the table generated for the parent object includes a title derived from the defined type.

3. The method of claim 1, wherein the parent object includes at least one key-value pair and the table generated for the parent object includes a column for each key of the at least one key-value pair.

4. The method of claim 1, wherein the child object includes at least one key-value pair and the table generated for the parent object includes a column for each key of the at least one key-value pair of the child object.

5. The method of claim 4, wherein a name of each column associated with each key defined in the child object is derived from a name of the child object.

6. The method of claim 1, wherein the serialized data includes another parent object having a child object, the child object of the other parent object having a defined identifier, and wherein the step of generating the telemetry data further comprises: generating a table for the other parent object and generating a separate table for the child object of the other parent object in response to the defined identifier.

7. The method of claim 1, wherein the serialized data includes another parent object having another array of child objects, each child object in the other array of child objects having the same defined type, and wherein the step of generating the telemetry data further comprises: generating a table for the other parent object and generating a separate table for the other array of child objects, the separate table including a row for each child object in the array of child objects.

8. A non-transitory computer readable medium having instructions stored thereon that when executed by a processor cause the processor to perform a method of generating telemetry data from application programming interface (API) data in a computing system, comprising:
obtaining the API data from a plurality of software components executing in a plurality of client computers; and
serializing the API data for transmission from the client computers to a server computer, the serialized data including at least one data structure that includes a parent object having an array of child objects comprising a child object and an additional child object, wherein:
the server computer, after receiving the serialized data, generates the telemetry data having a relational schema from the serialized data by generating a table for the parent object and storing attributes of the child object and the additional child object in the table generated for the parent object, wherein:
the child object has a first type;
the additional child object has a second type different than the first type;
generating the telemetry data further comprises generating a separate table for each of the child object and the additional child object;
if the child object or the additional child object does not include an explicit identifier defined by an identifier key, a default identifier is generated for the child object or the additional child object for inclusion in the table for the parent object; and
at least one of the parent object or the child object includes a primitive array, and the table generated for the parent object or the separate table generated for the child object includes a cell having serialized values of the primitive array.

9. The non-transitory computer readable medium of claim 8, wherein the parent object has a defined type and the table generated for the parent object includes a title derived from the defined type.

10. The non-transitory computer readable medium of claim 8, wherein the parent object includes at least one key-value pair and the table generated for the parent object includes a column for each key of the at least one key-value pair.

11. The non-transitory computer readable medium of claim 8, wherein the child object includes at least one key-value pair and the table generated for the parent object includes a column for each key of the at least one key-value pair of the child object.

12. The non-transitory computer readable medium of claim 11, wherein a name of each column associated with each key defined in the child object is derived from a name of the child object.

13. The non-transitory computer readable medium of claim 8, wherein the serialized data includes another parent object having a child object, the child object of the other parent object having a defined identifier, and wherein the step of generating the telemetry data further comprises: generating a table for the other parent object and generating a separate table for the child object of the other parent object in response to the defined identifier.

14. The non-transitory computer readable medium of claim 8, wherein the serialized data includes another parent object having another array of child objects, each child object in the other array of child objects having the same defined type, and wherein the step of generating the telemetry data further comprises: generating a table for the other parent object and generating a separate table for the other array of child objects, the separate table including a row for each child object in the array of child objects.

15. A computing system, comprising:
a hardware platform including a processor and memory; and
a software platform executing on the hardware platform, the software platform including a data transformer executable by the processor to:
obtain application programming interface (API) data from a plurality of software components executing in a plurality of client computers; and
serialize the API data for transmission from the client computers to a server computer, the serialized data including at least one data structure that includes a parent object having an array of child objects comprising a child object and an additional child object, wherein:
the server computer, after receiving the serialized data, generates telemetry data having a relational schema from the serialized data by generating a table for the parent object and storing attributes of the child object and the additional child object in the table generated for the parent object, wherein:
the child object has a first type;
the additional child object has a second type different than the first type;
generating the telemetry data further comprises generating a separate table for each of the child object and the additional child object;
if the child object or the additional child object does not include an explicit identifier defined by an identifier key, a default identifier is generated for the child object or the additional child object for inclusion in the table for the parent object; and at least one of the parent object or the child object includes a primitive array, and the table generated for the parent object or the separate table generated for the child object includes a cell having serialized values of the primitive array.

16. The computing system of claim 15, wherein the parent object has a defined type and the table generated for the parent object includes a title derived from the defined type.

17. The computing system of claim 15, wherein the parent object includes at least one key-value pair and the table generated for the parent object includes a column for each key of the at least one key-value pair.

18. The computing system of claim 15, wherein the child object includes at least one key-value pair and the table generated for the parent object includes a column for each key of the at least one key-value pair of the child object.

19. The computing system of claim 18, wherein a name of each column associated with each key defined in the child object is derived from a name of the child object.

20. The computing system of claim 15, wherein the serialized data includes another parent object having a child object, the child object of the other parent object having a defined identifier, and wherein the step of generating the telemetry data further comprises: generating a table for the other parent object and generating a separate table for the child object of the other parent object in response to the defined identifier.

* * * * *